United States Patent [19]

Coon

[11] Patent Number: 5,040,328
[45] Date of Patent: Aug. 20, 1991

[54] MUSHROOM TRAY

[76] Inventor: Gerald L. Coon, Kadon Corporation, 3031 Dryden Rd., P.O. Box 1948, Dayton, Ohio 45401-1948

[21] Appl. No.: 464,846

[22] Filed: Jan. 16, 1990

[51] Int. Cl.$^5$ ............................ A01G 1/04; A01G 9/00; C10L 1/18

[52] U.S. Cl. ................................ 47/1.1; 47/18; 47/39; 47/66; 206/505; 206/507; 206/509; 206/557; 220/500; 220/501; 220/529

[58] Field of Search ............... 47/1.1, 18, 39, 66; 206/503, 505–507, 557, 423; 220/72.1, 71, DIG. 25, 69, 70, 70.1

[56] References Cited

U.S. PATENT DOCUMENTS

| | | | |
|---|---|---|---|
| 3,118,249 | 1/1964 | Bard et al. | 47/1.1 |
| 3,842,534 | 10/1974 | Walters et al. | 47/1.1 |
| 3,935,673 | 2/1976 | Robins | 47/1.1 |
| 3,992,808 | 11/1976 | Stengel | 47/1.1 |
| 4,001,966 | 1/1977 | Metzner | 47/1.1 |
| 4,226,047 | 10/1980 | Maaijwee | 47/1.1 |
| 4,329,813 | 5/1982 | Halttula | 47/66 |
| 4,924,623 | 5/1990 | van Rens | 47/18 |

Primary Examiner—Howard J. Locker
Attorney, Agent, or Firm—Thompson, Hine and Flory

[57] ABSTRACT

A mushroom tray comprising a tray portion having opposing sidewalls, opposing end walls and a substantially flat bottom sheet having a parallity of channels formed therein and extending therealong, corrosion-resistant I-beams positioned within the channels for strengthening and stiffening the bottom sheet, and a parallity of clips for securing the I-beams to the underside of the bottom sheet. In a preferred embodiment, the trays include downwardly projecting legs which are shaped enable the trays to be stacked vertically. Also in the preferred embodiment, the trays are made of a polyolefin and the I-beams are made of aluminum. The end walls also preferably include I-beams for re-enforcement; the I-beams are totally enclosed in the end wall structure to minimize exposure to a corrosive atmosphere.

22 Claims, 3 Drawing Sheets

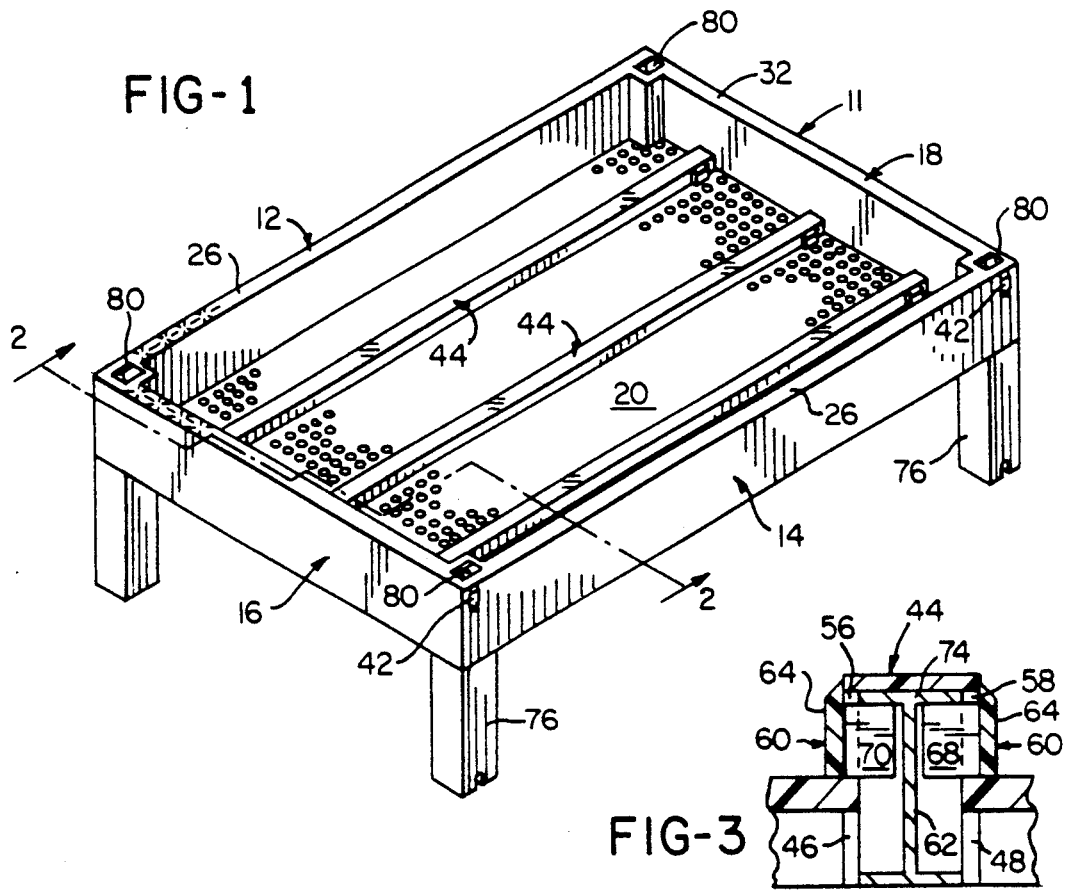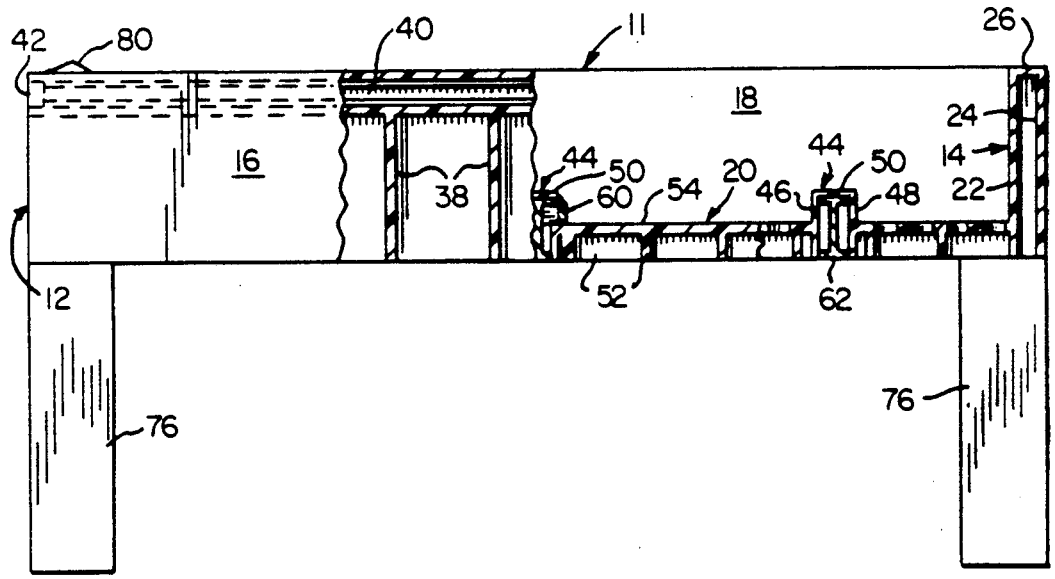

MUSHROOM TRAY

BACKGROUND OF THE INVENTION

The present invention relates to mushroom trays and, more particularly, to mushroom trays designed for repeated use in a stacked relation.

The farming of mushrooms on a large scale typically requires the use of mushroom trays to support the compost medium for growing mushrooms. The trays are rectangular in shape and are stackable to maximize the space provided in the mushroom growing enclosure, which often is an abandoned mine. Mushroom trays were originally made of wood, since wood was the least expensive material that could meet the minimum standards of strength and durability required for cost-efficient mushroom farming. However, wood possessed the disadvantage of being porous and therefore providing a matrix for the growth of harmful molds or viruses which might affect mushroom growth.

More recently, the rising cost of wood has made it undesirable for use in the construction of mushroom trays, especially when considering the limited life of a wooden mushroom tray, which is approximately three to five years. Consequently, mushroom trays have been designed which are fabricated of different materials. For example, the mushroom trays disclosed in Walters, et al. U.S. Pat. No. 3,842,534 and Maaijwee U.S. Pat. No. 4,226,047 are fabricated of extruded aluminum. The Walters, et al. tray includes a floor made of U-shaped aluminum channel and the Maaijwee tray includes a floor made of a plurality of transverse sections supported by longitudinally extending aluminum tubes.

Such mushroom trays presently possess the requisite strength to withstand multiple tray stacking and transportation by forklift trucks, and may have useful lives that exceed those of wooden trays. However, such trays are inherently expensive and aluminum, while resistant to the corrosive environment in which mushrooms are grown, is not entirely impervious to the caustic compost material in which mushrooms are grown when brought into direct contact with it. Accordingly, there is a need for a mushroom tray design which possesses strength characteristics comparable to all-aluminum mushroom trays, yet is cheaper to fabricate and is more resistant to corrosion.

SUMMARY OF THE INVENTION

The present invention is a mushroom tray having a tray portion with opposing side walls, opposing end walls, a substantially flat bottom sheet having a plurality of channels, and a plurality of corrosion-resistant I-beams retained within the channels to provide stiffness and strength to the bottom sheet of the tray. In the preferred embodiment, the tray portion is fabricated of a temperature-resistant plastic such as a polyolefin. The channels in the bottom sheet open downwardly and the I-beams are retained within the channels by clips which extend through the walls of the channels and support the beams by their upper flanges. This mounting structure separates the I-beams from the compost supported in the tray, thereby minimizing the corrosive effect of the compost on the beams.

Also in the preferred embodiment, the end walls include longitudinal passages which receive stiffening I-beams, also made of a corrosion-resistant material such a aluminum. The passages are closed by end caps so that these beams are isolated from the corrosive mushroom growing environment.

The mushroom tray also includes removable legs having recesses in their undersides shaped to engage bosses protruding upwardly from the trays so that a plurality of such trays can be arranged securely in a vertical stack.

Accordingly, it is an object of the present invention to provide a mushroom tray which is relatively light in weight yet possesses sufficient strength and rigidity to support a layer of compost material for growing mushrooms; a mushroom tray which is made of a material which resists the corrosive, mushroom growing environment and yet is relatively inexpensive; a mushroom tray which is made of a material that has a much higher rate of heat transfer than wood so that the minimal heat energy required to sterilize the tray is cost-effective; and a mushroom tray which is relatively easy to assemble and disassemble.

Other objects and advantages of the invention will be apparent from the following description, the accompanying drawings and the appended claims.

BRIEF DESCRIPTION OF THE DRAWINGS

FIG. 1 is a perspective view showing a preferred embodiment of the mushroom tray of the present invention;

FIG. 2 is an end elevation of the mushroom tray of FIG. 1, sectioned at line 2—2 of FIG. 1;

FIG. 3 is a detail of the mushroom tray of FIG. 1 showing the engagement of the clips with the bottom sheet and struts;

DETAILED DESCRIPTION OF THE PREFERRED EMBODIMENT

Figure 4:
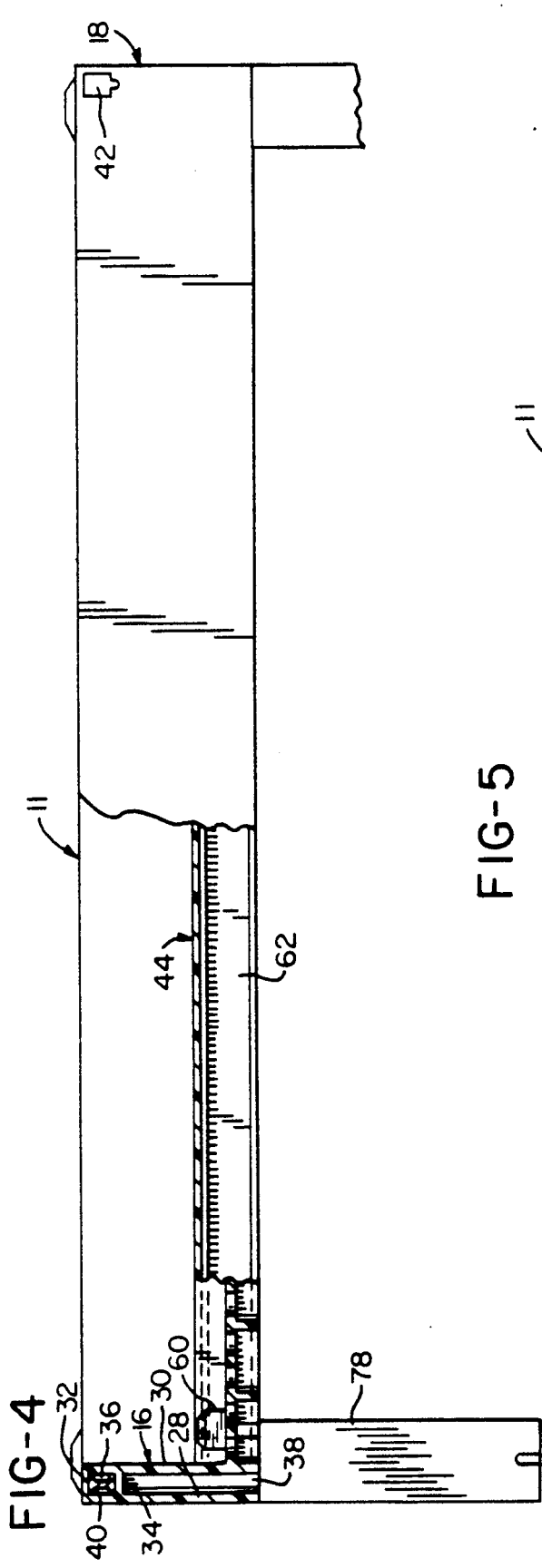
FIG. 4 is a side elevation of the mushroom tray of FIG. 1, partially broken away to reveal details of the end wall and bottom sheet structure.

As shown if FIG. 1, the mushroom tray of the present invention includes a tray portion, generally designated 11, which includes opposing side walls 12, 14, opposing end walls 16, 18 and a perforated bottom sheet 20. The tray portion is made of a polyolefin, preferably a high-density polyethylene. In the alternative, the tray portion can be made of any plastic material which is relatively inexpensive and possesses the qualities of corrosion resistance, impact resistance, durability, and strength at elevated temperatures.

As shown in FIG. 2, the side wall 14 comprises inner and outer members 22, 24 and a top wall 26. Side wall 12 is of similar construction.

End wall 16 (see also FIG. 4) includes inner and outer members 28, 30, top wall 32 and web 34. Top wall 32 and web 34 extend between members 28, 30 to define a longitudinal passage 36. End wall 16 also includes a plurality of vertical webs 38, extending between members 28, 30 and web 34. Webs 34 and 38 act to stiffen the end wall 16. End wall 18 is of similar construction.

Figure 5:
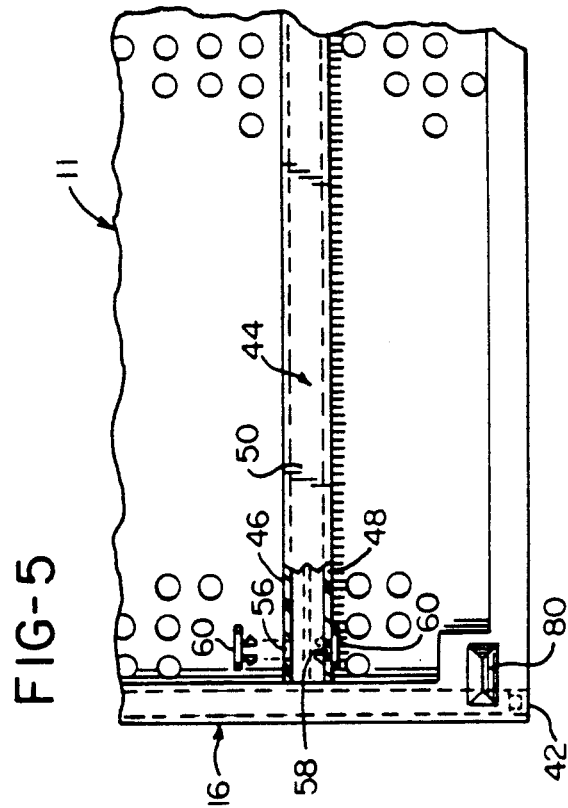
FIG. 5 is a detail top plan view of the mushroom tray of FIG. 1, partially broken away to show the engagement of the clips with the bottom sheet and strut.

An end strut 40 is positioned within the longitudinal passage 36 and is retained therein by end caps 42 (see also FIG. 5). End strut 40 preferably is an I-beam made of a corrosion-resistant material such as aluminum.

The bottom sheet 20 of the tray portion 11 is substantially flat and includes a plurality of channels 44 extending longitudinally of the tray between the end walls 16, 18 (see FIGS. 1 and 2). Each channel opens downwardly and includes opposing side walls 46, 48 and a top wall 50 (see also FIG. 5).

The bottom sheet 20 also includes downwardly extending ribs 52 which criss cross to form a grid pattern. Ribs 52 stiffen the floor 54 of the bottom sheet 20 to minimize flexing.

As shown in FIGS. 3 and 5, the channels include at least two pairs of opposing openings 56, 58 in side walls 46, 48, respectively. Preferably, each pair of holes 56, 58 is adjacent to an end wall 16, 18 for each channel 44.

Figure 6:
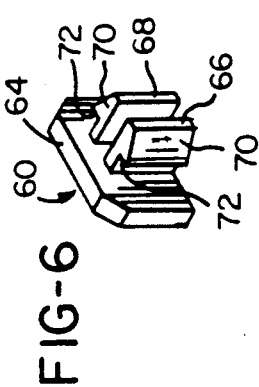
FIG. 6 is a perspective view of a typical clip used in the mushroom tray of FIG. 1.

Pairs of clips 60, one of which is shown in FIG. 6, are inserted into the holes 56, 58 and retain struts 62 within the channels 44. Struts 62 preferably comprise extruded aluminum I-beams, but can be made of other corrosion resistant material. The clips 60 each include a base portion 64 and a pair of protruding prongs 66, 68. The prongs 66, 68 each terminate in a wedge-shaped portion 70 having an undercut segment 72. As shown FIG. 3, the base portion 64 of clips 60 is shaped to cover the holes 56, 58 and the prongs 68, 70 are shaped to support the upper flange 74 of the I-beam strut 62, thereby retaining the I-beam within the channel 44.

The wedge-shaped portions 68, 70 are shaped to retain the clips 60 within the holes 56, 58 as shown in FIG. 5. In order to insert the prongs 68, 70 of a clip 60 into one of the holes 56, 58, the prongs are deflected toward each other as the wedge-shaped portions 68, 70 engage the walls 46, 48 of the holes 6, 58 then, as the undercut portions 72 engage the edges of the walls 46, 48 surrounding the holes 56, 58, the prongs 66, 68 spring away from each other to resume the position shown in FIG. 6. Accordingly, the clips 60 are retained within the holes 56, 8 by the engagement of the prongs 66, 68 with the edges of the side walls 46, 48 surrounding the holes.

As shown in FIGS. 1 and 7-10 the tray portion 11 is supported by four legs 76, positioned at each corner of the tray portion. The legs 76 are generally square in a horizontal cross-section and include bottom webs 78 forming recesses shaped to receive raised bosses 80 which are formed in the upper surface of the tray 11 (see FIG. 1). The recess 78 and boss 80 engagement enable the trays to be stacked in a vertical column.

As shown in FIGS. 7-10, each leg 76 includes a recess 82 which is defined by side walls 84, 86, 88, 90 and a cruciform webbing 92 having an upper surface 94 which forms the bottom of the recess 82. The cruciform webbing 92 also is connected to the bottom web 78 in the bottom of the leg 76.

Figure 7:
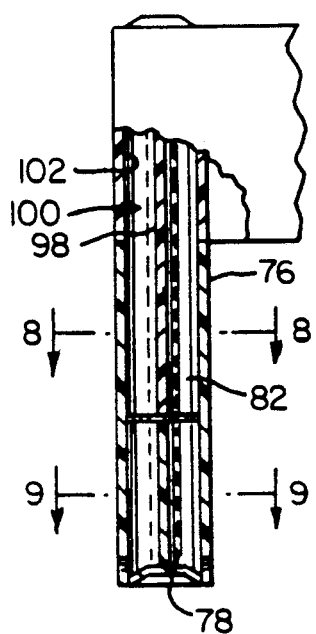
FIG. 7 is a detail of the mushroom tray of FIG. 1, partially broken away to reveal the structure of a tray leg.
Figure 8:
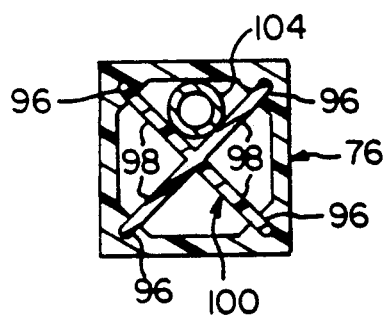
FIG. 8 is a leg cross section taken at line 8—8 of FIG. 7.
Figure 9:
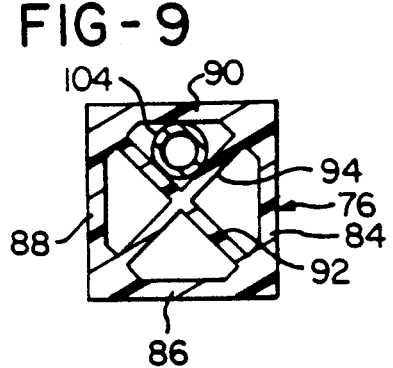
FIG. 9 is a leg cross section taken at line 9—9 of FIG. 7.
Figure 10:
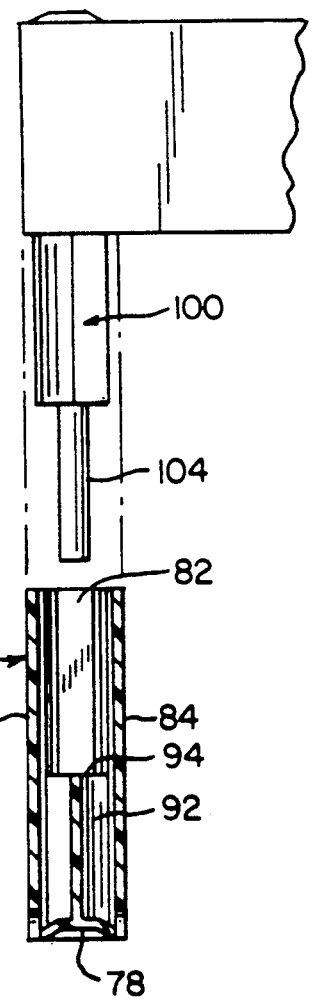
FIG. 10 is a detail of the mushroom tray of FIG. 1 showing a leg, in section, exploded away from the tray portion.

The corners of the recesses 82 each include slots 96 which receive the flanges 98 of a cruciform insert 100. As shown in FIG. 7, the insert 100 is received within a corresponding recess 102 formed the corners of the tray portion 10, and is shaped to rest upon the top surface 94 of the recess 82. In order to strengthen the leg structure 76, a length of tubing 104 is positioned within the leg and is shaped such that it contact the interior surface of wall 90 and flanges 98 of the insert. Tubing 104 preferably is made of corrosion-resistant material such as aluminum.

In addition, tubing 104 extends downwardly below the top surface 94 of the leg recess 82 and contacts the cruciform web 92. The leg structure 76 is held in place by a suitable adhesive. The tubing 104 rests upon the upper surface of the recess 78 in the bottom of the leg assembly 76. Preferably, the leg assembly 76 is made of the same material as the tray portion 11; that is, a polyolefin or a high-density polyethylene.

The assembly and use of the mushroom tray is as follows. The legs are first attached to the tray by applying adhesive to the cruciform inserts 100, then inserting the inserts into the recesses 102 in the tray corners and then inserting the aluminum tubes 104 alongside the inserts. The legs 76 are then slid over the insert and tube combination 100, 104 until the bottoms of the insert and tubes rest upon the upper surfaces 94 of the cruciform webs 92 of the legs 76. The I-beam struts 62 are inserted into the underside of the channels 44 and retained therein by the clips 60 which are inserted through the holes 56, 58 at the ends of the channels adjacent the end walls 16, 18. The clips 60 are retained permanently within the holes 56, 58 by the prongs 66, 68, the undercut segments 72 of which engage the adjacent portions of the side walls 46, 48 of the channels 44.

I-beam and struts 40 are inserted into the longitudinal passages 36 of the end walls 16, 18 and are retained therein by end caps 42. The mushroom tray is now ready to receive the mushroom growing medium, which is a combination of an appropriate compost mixed with mycelium. The trays can be stacked vertically, up to 7 trays high, by arranging the trays so that the bottom recesses 78 in the legs 76 receive the raised bosses 80 of the tray next below it. In addition, the top walls 26, 32 of the tray portion 11 include treads which allow the stack to be climbed like a ladder for inspecting or picking the growth of mushrooms in the upper trays.

After several flushes of mushrooms have been harvested, the trays emptied and disinfected in order to remove embryos of harmful molds or viruses. The disinfecting process typically includes elevating the temperature of the environment of the mushroom trays to approximately 152° F. Throughout the growing process of the mushrooms, the trays may have to be moved by forklifts, and they are sufficiently rigid to be picked up by the forks of a forklift truck inserted under the side walls 12, 14 of the tray.

While the form of apparatus herein describe constitutes a preferred embodiment of this invention, it is to be understood that the invention is not limited to this precise form of apparatus, and that changes may be made therein without departing from the scope of the invention.

What is claimed is:

1. A lightweight, rigid mushroom tray comprising:
   a tray portion supporting mushroom growing media, said tray portion having opposing side walls, opposing end walls and a substantially flat bottom sheet having a plurality of downwardly-opening channels formed thereon and extending therealong said tray portion being made of a lightweight, plastic material which resists corrosion;
   a plurality of I-beams made of corrosion-resistant material, each being positioned within and extending along corresponding ones of said channels for strengthening and stiffening said bottom sheet, said I-beams being separated from and held out of contact with material in said tray by said channels;

means for securing said I-beams within said channels; and means engaging said tray portion for enabling a plurality of said trays to be stacked vertically in a spaced relationship.

2. The tray of claim 1 wherein said securing means includes clip means for attaching said I-beams to said bottom sheet.

3. The tray of claim 2 wherein said bottom sheet is continuous across said tray portion.

4. The tray of claim 3 wherein said clip means includes a plurality of clip members, each of said clip members having a flat base and a pair of flexible prongs.

5. The tray of claim 4 wherein said bottom sheet includes a substantially flat floor and said channels each include side walls protruding upwardly from said floor, said side walls having a plurality of openings therethrough shaped to receive said prongs of one of said clip members therein.

6. The tray of claim 5 wherein said base of each of said clip members is shaped to cover an associated one of said openings.

7. The tray of claim 6 wherein said prongs each include a wedge-shaped outer portion sized to require said prongs of one of said a clip members to be deflected toward each other when said prongs are inserted through one of said openings, whereby said outer portions lock said clip member within said opening.

8. The tray of claim 7 wherein said outer portions engage and support a flange of an associated one of said I-beams, thereby retaining said I-beam within an associated one of said channels, when said prongs are inserted through one of said openings therein.

9. The tray of claim 1 wherein said end walls each include a longitudinal passage therethrough and end strut means, extending through said passage, for stiffening said end walls.

10. The tray of claim 9 wherein said end walls each totally enclose said passage along a length of said passage.

11. The tray of claim 10 wherein said end walls each include cap means for closing ends of said passage.

12. The tray of claim 9 wherein said end strut means comprises an I-beam extending along each of said passages.

13. The tray of claim 1 wherein said tray portion is made of a polyolefin.

14. A lightweight, rigid mushroom tray comprising:

a reinforced tray portion supporting mushroom growing media, said tray portion having opposing side walls, opposing end walls and a substantially flat bottom sheet, said end walls each including a longitudinal passage therethrough said tray portion and said end walls being made of a lightweight, plastic material which resists corrosion;

end strut means including a plurality of I-beams made of a corrosion-resistant material extending through said passages for stiffening said end walls, said passages being shaped to separate said end strut means from, and hold said end strut means out of contact with, material carried in said tray;

means for releasably securing said end strut means within said passages; and means engaging said tray portion for enabling a plurality of said trays to be stacked vertically.

15. The tray of claim 14 wherein said end walls are shaped to totally enclose said strut means along a length of said strut means when positioned within said passage.

16. The tray of claim 15 wherein said releasable securing means comprises cap means for closing said passages, whereby said strut means is totally enclosed within said passages.

17. The tray of claim 14 wherein said engaging means includes a plurality of legs extending downwardly from said tray portion; and boss means protruding upwardly from said tray means for securing legs of a second of said trays, superposed to said tray.

18. The tray of claim 17 wherein each of said legs includes a recess, an insert attached within said recess, and said tray portion includes recesses shaped to receive said inserts, whereby said inserts join said legs to said tray portion.

19. The tray of claim 18 wherein said inserts are cruciform in shape and said recesses include slots shaped to receive said inserts.

20. The tray of claim 18 further comprising strengthening means in said recesses for stiffening said legs.

21. The tray of claim 20 wherein said strengthening means comprises tubular inserts extending along said legs.

22. The tray of claim 21 wherein said tubular inserts are substantially coextensive with said leg and insert combinations.

* * * * *